UNITED STATES PATENT OFFICE.

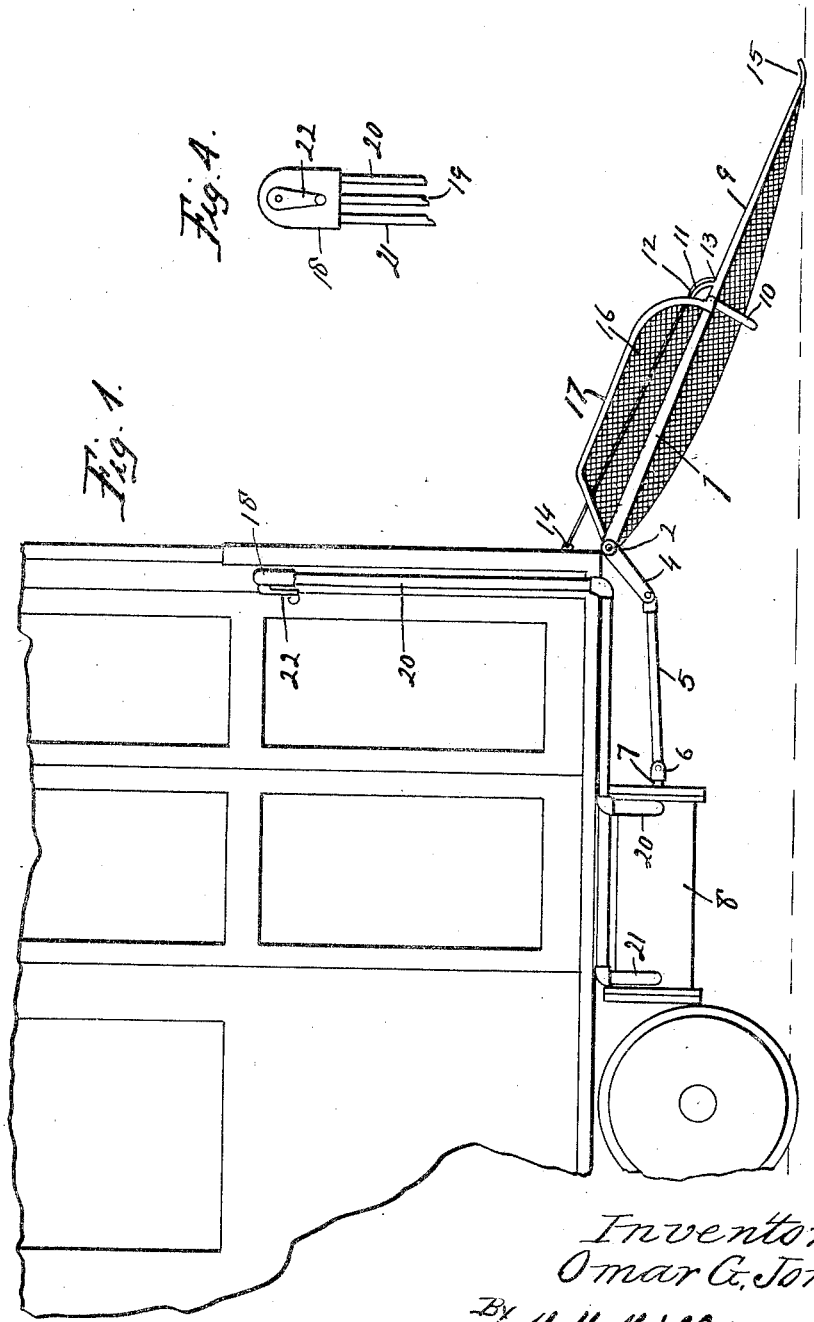

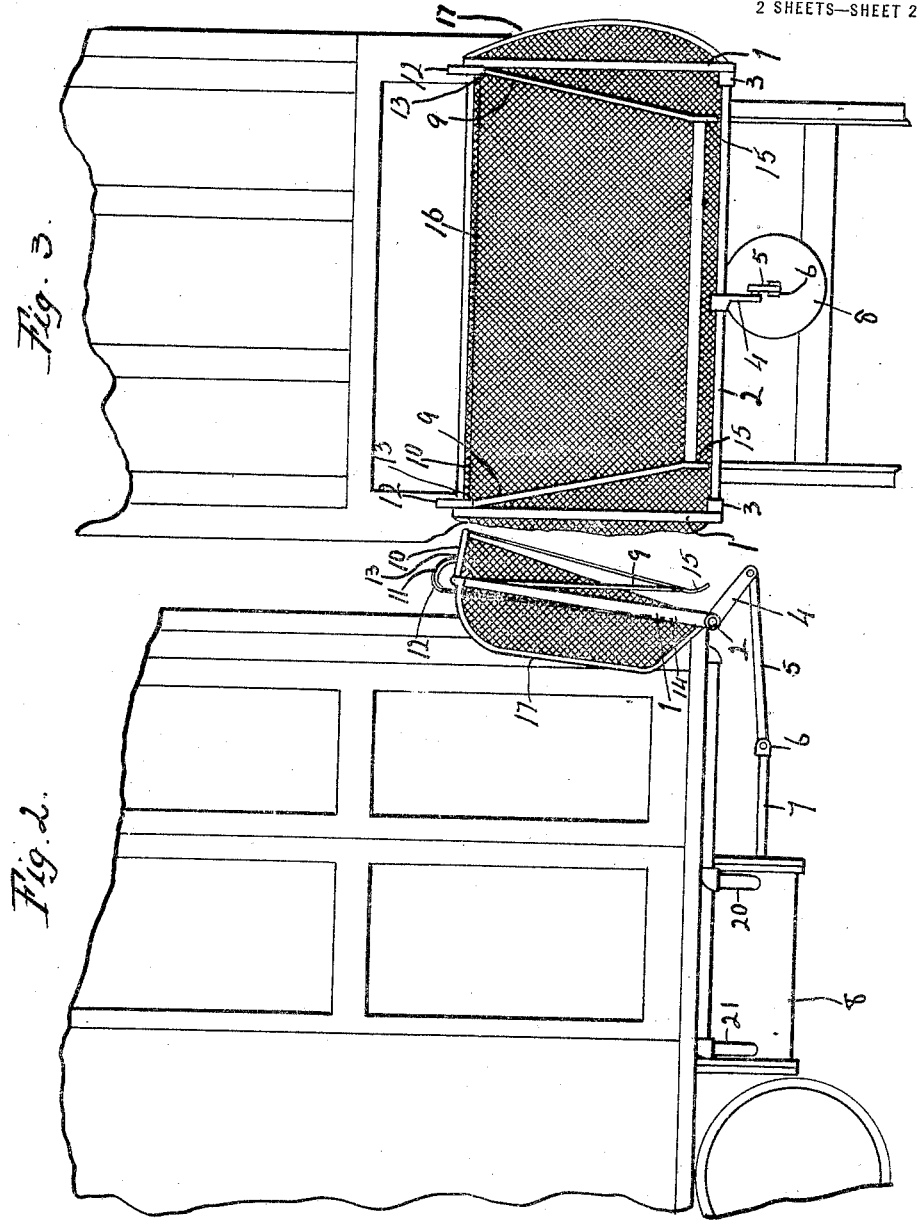

OMAR G. JONES, OF PHILADELPHIA, PENNSYLVANIA.

CAR-FENDER.

1,343,727.　　　　Specification of Letters Patent.　　Patented June 15, 1920.

Application filed November 1, 1919. Serial No. 334,911.

*To all whom it may concern:*

Be it known that I, OMAR G. JONES, a citizen of the United States, residing at Philadelphia, in the county of Philadelphia and State of Pennsylvania, have invented new and useful Improvements in Car-Fenders, of which the following is a specification.

My invention relates to a new and useful improvement in car fenders, and has for its object to so construct a device of this description that it may be actuated by air pressure to be swung into and out of operative position by the proper manipulation of a valve lever within reach of the motorman, and A further object of my invention is to provide for the automatic folding of the sections of the fender when it is swung out of operative position and have the sections thereof to come into proper relation when swung into operative position.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Figure 1, is a side elevation of a portion of a car showing the fender in its operative position.

Fig. 2, is a similar view showing the fender swung out of operative position.

Fig. 3, is a front view of Fig. 2; and

Fig. 4, is an enlarged detail view of an actuating valve and a portion of the air pipe system.

In carrying out my invention as here embodied, 1 represents the frame of the main section of the fender the inner ends of which are rigidly secured to the shaft 2 which latter is pivoted in the bearings 3. These bearings are secured in any convenient manner to the front of the car.

On the shaft 2 is rigidly secured the crank arm 4 to the outer end of which is pivoted the connecting rod 5 the opposite of said connecting rod being pivoted to the head 6 of the piston rod 7. This piston rod passes into the air cylinder 8 and carries the usual piston.

9 represents the frame of the secondary section of the fender which is hinged to the main section by the curved rod 10.

To each side of the frame of the secondary section 9 is secured a segment 11 over which runs a flexible member 12 such as a steel band, chain or the like, which flexible members are attached at 13 to the frame 9 and at 14 to the front of the car in such manner that when the main frame 1 is swung upward the secondary frame 9 will swing inward to the position shown in Fig. 2; but when the main frame is swung down into operative position these flexible members will cause the secondary frame 9 to come into approximate alinement with the primary frame as shown in Fig. 1.

To the outer edge of the secondary frame 9 are secured two shoes 15 which are intended to contact with the rails of the track over which the car is running when the fender is brought into operative position.

16 represents a suitable netting which is secured to the main and secondary frames for holding a person should he be struck and thrown upon the fender, and in order that in the case of such accident the person will be further protected against falling off the fender, I provide sides or wings 17 for the main frame.

18 represents a 3-way valve which has connected the supply pipe 19 leading from any suitable compressed air source and from this valve leads the pipes 20 and 21 the former being connected with the front end of the cylinder 8 and the latter with the rear end of said cylinder so that when the valve is actuated by the valve handle 22 air is admitted either to the front or rear end of the cylinder, and if admitted to the rear end the fender will be elevated out of action to the position shown in Fig. 2, while when air is admitted to the front end of the cylinder the fender will be drawn downward to the position shown in Fig. 1.

In practice the fender is normally held out of operative position as shown in Fig. 2, but when an accident is imminent the motorman has only to operate the valve lever 22 in the proper direction to immediately bring the fender into operative position and in so doing the shoe 15 will contact with the rails thus making it impossible for a person or other object struck to pass under the fender. As it would not be practical for the shoes to follow the rails around curves the fender is normally held out of operative position thus removing all extended obstructions in front of the car thereby facilitating the turning of short curves and preventing accidents from the sweep of the fender.

Of course I do not wish to be limited to the exact details of construction as herein shown as these may be varied within the limits of the appended claims without departing from the spirit of my invention.

Having thus fully described my invention what I claim as new and useful is:—

1. A car fender comprising a main section hinged to a car, a secondary section pivoted to the main section, segments carried by the secondary section, flexible members secured to the secondary section and the car and passing over said segments, and means for raising and lowering the fender.

2. In combination with a car, a fender comprising a main section, a shaft to which said section is secured, said shaft being journaled upon the car, a crank arm secured to said shaft, an air cylinder, a piston rod actuated by said air cylinder, means for connecting the piston rod and crank arm, a secondary section pivoted to the main section, segments carried by the secondary section, and flexible members attached to the secondary section and the car passing over said segments.

3. In combination with a car, a fender comprising a main section, a shaft to which said section is secured, said shaft being journaled upon the car, a crank arm secured to said shaft, an air cylinder, a piston rod actuated by said air cylinder, means for connecting the piston rod and crank arm, a secondary section pivoted to the main section, segments carried by the secondary section, flexible members attached to the secondary section and the car passing over said segments, and two shoes carried by the secondary section for contacting with the rails of the track.

In testimony whereof, I have hereunto affixed my signature.

OMAR G. JONES.